United States Patent Office 3,758,412
Patented Sept. 11, 1973

3,758,412
METHOD OF SCINTILLATION COUNTING USING TRIARYLBORANES AS SCINTILLATORS
Frank Grum, Edwin Paul Przybylowicz, Lorenzo Federico Costa, and Raymond Sumner Miller, Rochester, N.Y., assignors to Eastman Kodak Company, Rochester, N.Y.
No Drawing. Filed July 27, 1970, Ser. No. 58,681
Int. Cl. F21k 2/02; C09k 1/00; G01t 1/20
U.S. Cl. 252—301.2 R                            10 Claims

ABSTRACT OF THE DISCLOSURE

Highly stable, highly fluorescent triarylboranes are employed in a scintillator solution as a primary or secondary scintillator solute.

BACKGROUND OF THE INVENTION

Field of the invention

This invention relates to radiation detection devices, especially to scintillation counters and to the scintillator solutions employed therein.

Description of the prior art

When a charged atomic or nuclear particle passes through matter, it dissipates its energy in the ionization and excitation of the molecules of the material. This ionization and/or excitation is the basis of all the major instruments used for the detection and measurement of such particles. Similar instruments are also used for the detection of uncharged radiations, which produce secondary charge particles in their passage through matter such as are produced, for example, by X-rays, $\gamma$-rays, and neutrons.

The different types of radiation detection instruments can be divided into three categories: dosimeters, track visualization instruments and counters, for example, scintillation counters.

In scintillation counters the fluorescence emission produced in a suitable solid, liquid, or gas by high energy particles, either charged or uncharged, is detected by a photomultiplier or other light-sensitive device. Such counters have been employed as simple detectors recording all ionizing particles passing through their sensitive volume; as ratemeters recording the radiation flux; as spectrometers yielding information about the energies and relative intensities of the ionizing radiations; as particle discriminators differentiating between different types of radiation; as timing devices recording prompt or delayed coincidences between related ionizing particles; as particle selectors choosing ionizing particles or events which satisfy certain energy, temporal and/or spatial criteria. Radiations and particles which scintillation counters are employed to detect include neutrons, X-rays, $\gamma$-rays, electrons, positrons, protons, deuterons, tritons, $\alpha$-particles, fission fragments, $\mu$-mesons, $\pi$-mesons, and the great variety of other particles produced in high energy nuclear reactions.

The scintillation process is the transformation of energy dissipated as ionization and excitation by a substance into luminescence emission. The substance which performs this transformation is a scintillator.

The requirement of a scintillator, frequently called a scintillation solute, phosphor or fluor, is that it absorb and transform radiant energy into luminescence emission. Jack DeMent, "Fluorochemistry," Chemical Publishing Co., Inc., Brooklyn, N.Y. (1945), p. 27, cautions that ". . . in the strictest sense of the term there is no such thing as a non-fluorescent compound . . . ." The number of compounds however whose quantum efficiency of fluorescence is adequate for use as scintillators is limited. Quantum efficiency of fluorescence is the ratio of the number of quanta emitted as fluorescence to the number of quanta absorbed in excitation.

Both organic and inorganic materials have been employed as scintillators in scintillation counters. The earliest scintillators were inorganic materials such as willemite, barium platinocyanide, brown diamond, zinc sulfide, etc. A primary disadvantage of the inorganic materials is that they are available only as small crystals or crystalline powders and thus must be used as multi-crystalline screens which are opaque to their own luminescence in thicknesses greater than about 0.1 mm. Further, they cannot be used in organic solvent solutions due to insolubility.

Many new organic materials have been evaluated for use as scintillators in scintillation counters. Among the more significant improvements is the discovery that organic scintillator solutions can be employed in place of solids thus obviating the need for large, pure, crystalline blocks. It has further been found that a substance to be tested, for example a sample which has been tagged with radioactive material such as carbon-14, can be added directly to the scintillator solution or "cocktail" for measurement.

It has been further found that it is advantageous to employ certain solvents, or mixed solvents particularly those having an abundance of $\pi$-electrons such as xylene, toluene, and the like which act as "energy transfer solvents," i.e., they absorb the ionization and excitation energy and transfer it to the scintillator solute.

Among the factors determining the efficiency with which a given scintillation counter operates is how well matched are the wavelengths of radiation emitted by the scintillator solute and the wavelengths effectively absorbed by the photomultiplier. These emission and absorption wavelengths must at least overlap, and preferably should perfectly match. Most commercially available photomultipliers absorb in the range of 400–500 nanometers. In the absence of a single scintillator which will efficiently absorb incident, high energy radiation and emit light in this range, there has been developed scintillator devices comprising primary and secondary scintillator solutes.

In a scintillator solution, the incident, high energy radiation is absorbed by the energy transfer solvent and is eventually emitted by the solvent with a fluorescence emission characteristic preferably in the range of 250–350 nm. The primary fluor, to be able to absorb the eventual emission of the solvent, should have an absorption characteristic in the range of 250–350 nm., and preferably about 288 nm. when employed with the dioxane-naphthalene solvent system. The better primary scintillator solutes satisfy these absorption characteristics. One of the most widely employed primary scintillator solutes is 2,5-diphenyloxazole.

The primary scintillator solutes generally have a fluorescence emission characteristic between 350 and 400 nm. Many commercially available photomultipliers, however, are sensitive in the range of 400–500 nm. The primary scintillator solutes therefore cannot efficiently excite the photomultiplier, hence the use of secondary scintillator solutes also referred to as "wavelength shifters," has come to be used widely.

The requirements of a useful secondary scintillator solute are (1) that its absorption characteristics at least overlap, and preferably match the fluorescence emission characteristics of the best known primary scintillator solutes, i.e., 350–400 nm., and (2) that its fluorescence emission characteristics at least overlap, and preferably match, the spectral sensitivity characteristics of the available photomultipliers, i.e., about 400–500 nm. 2,2'-p-phenylenebis(5 - phenyloxazole) popularly known as POPOP is a most widely employed secondary scintillator solute.

Prior art scintillation counters employed for detecting neutrons must contain a substance which absorbs neutrons (a non-ionizing type radiation) and emits alpha particles (an ionizing type radiation). Compounds generally employed are those containing boron. The addition of substances to scintillator solutions capable of converting neutrons to alpha particles complicates an already complicated system.

The art would greatly benefit should there be provided scintillator solutes which can readily convert neutrons to alpha particles thereby allowing for a simple scintillator system comprising solvent and scintillator solute. The instruments and processes employing such a system would be expected to yield higher counting efficiencies for neutrons.

It is furthermore highly desirable to find new compounds which operate substantially as well as POPOP as a secondary scintillator solute, i.e., absorbing in the range of 350–400 nm. and emitting in the range of 400–500 nm. It is particularly desirable to discover scintillator solutes which can operate at a fluorescence efficiency, i.e., the ratio of the number of quanta emitted as luminescence to the number of quanta absorbed in excitation, greater than POPOP. It is additionally desirable that the art be provided with a scintillator solute capable of absorbing in the range of 250–350 nm. and emitting in the range of 400–500 nm. thereby eliminating the particular need for a secondary scintillator solute.

SUMMARY OF THE INVENTION

In accordance with this invention, there is provided substantially more efficient scintillator solutions for employment in radiation detection devices such as scintillator counters. The radiation detection devices provided for by this invention employ at least one fluorescent solute comprising a triarylborane having at least four carbon atoms adjacent to the carbon atom bonded directly to the boron atom substituted with hindering groups and additionally wherein at least one of said aryl groups is an aromatic polycyclic group or a phenyl group substituted in the ortho or para position with an electron donating substituent.

It is an object of this invention to provide novel scintillation counters useful in detecting high energy radiation. It is another object to provide new scintillator solutes for scintillation counters. It is a further object to provide new scintillator solutes having a peak spectral absorption range between 350–400 nm., and a peak spectral emission range between 400–500 nm. It is still a further object to provide said scintillator solutes for use as secondary scintillator solutes in scintillation counters. It is yet another object to provide boron atom-containing scintillator solutes useful in counters employed for detecting neutrons. It is still another object to provide scintillator solutions containing said scintillator solutes and processes employing said solutes.

DESCRIPTION OF THE PREFERRED EMBODIMENT

In accordance with this invention, the above and other objects of this invention are attained by providing new scintillator solutions containing a class of highly stable, highly fluorescent triarylborane compounds. It has been surprisingly discovered that the triarylboranes employed in this invention have a spectral absorption range substantially corresponding to the average spectral absorption ranges of the preferred prior art primary scintillator solutes, and a spectral emission range substantially corresponding to the average spectral sensitivity ranges of the more common commercially available photomultipliers. It has further been discovered that the triarylboranes employed in this invention are particularly useful as secondary scintillator solutes since their peak spectral absorption characteristic lies in the range of 350–400 nm., substantially corresponding to the emission characteristics of the well-known primary scintillator solutes, and its peak spectral emission characteristics lie in the range of 400–500 nm. which substantially corresponds to the average spectral sensitivity ranges of the most common commercially available photomultipliers.

The scintillator solutes employed in this invention, in general, comprise triarylboranes having at least four carbon atoms adjacent to the carbon atom bonded directly to the boron atom substituted with hindering groups, and additionally wherein at least one of said aryl groups is an aromatic polycylic group or a phenyl group substituted in the ortho or para position with an electron donating substituent. Illustrative hindering groups are alkyl groups, including substituted alkyl groups, alkoxy groups, tertiary amino groups and other electron donating groups, aryl groups, including substituted aryl groups, or a benzo or naphtho group fused at an ortho and adjacent meta position. Illustrative electron donating groups are hydroxy, alkoxy, aralkoxy, amino including substituted amino, alkylazo, arylazo, unsaturated aliphatic groups and aryl substituted unsaturated aliphatic groups wherein the unsaturation is conjugated to the central aryl group and the like. Illustrative polycyclic groups are naphthyl, anthryl, phenanthryl, acenaphthyl, pyrenyl, chrysenyl and derivatives thereof and the like.

The triarylboranes of this invention include those represented by the structural formula:

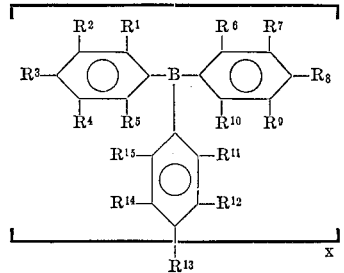

wherein $x$ is an integer of 1 to 3; each of $R^1$, $R^2$, $R^4$, $R^5$, $R^6$, $R^7$, $R^9$, $R^{10}$, $R^{11}$, $R^{12}$, $R^{14}$ and $R^{15}$ are the same or different and can be hydrogen; halide, e.g., chloride, bromide or iodide; an alkyl group, including substituted alkyl groups, e.g., methyl, ethyl, n-propyl, i-propyl, butyl, sec-butyl, t-butyl, octyl, benzyl, methylbenzyl, decyl, pentadecyl and the like; phenyl including substituted phenyl groups e.g., tolyl, xylyl, hydroxyphenyl, and the like; an electron donating group, e.g., an alkoxy group including substituted alkoxy such as methoxy, ethoxy, propoxy, butoxy, pentyloxy, hexoxy, and the like; aryloxy, e.g., phenoxy; aralkoxy such as benzyloxy and the like; hydroxy; amino, including substituted amino, e.g., morpholino, piperidino, alkyl and dialkylamino wherein the alkyl groups can have from 1–6 carbon atoms, dibenzylamino, cycloalkylamino such as cyclohexylamino, diarylamino, including substituted aryl such as diphenylamino, bis(p-methoxyphenyl)amino; arylazo, e.g., phenylazo, substituted phenylazo and the like; unsaturated aliphatic groups including substituted unsaturated aliphatic groups wherein the unsaturation is conjugated to the central aryl group, e.g., vinyl, allyl, butenyl, styryl, julolid-9-ylvinyl and the like, or each pair of $R^1$ and $R^2$, $R^4$ and $R^5$, $R^6$ and $R^7$, $R^9$ and $R^{10}$, $R^{11}$ and $R^{12}$, $R^{12}$ and $R^{13}$, $R^{13}$ and $R^{14}$ and $R^{14}$ and $R^{15}$ individually or when taken together represent the atoms necessary to complete a fused benzo or naphtho ring or a fused aromatic polycyclic ring system which may also have acyclic rings fused thereto, for example, the phenyl group containing $R^{11}$ to $R^{15}$ can be a naphthyl, anthryl, acenaphthyl, pyrenyl, chrysenyl, and the like; each of $R^3$ and $R^8$ can be hydrogen, halide, cyano, carboxy, chlorocarbonyl, ester, an alkyl group, such as described above or an electron donating group such as described above; $R^{13}$ is one of the group described for $R^3$ and $R^8$ when $x$ is 1, a covalent bond, alkylimino, e.g., methylimino, ethylimino and the like; cycloalkylimino, e.g., cyclohexylimino and the like; or vinylene when $x$ is 2, or an

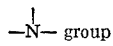

group when $x$ is 3; with the provisos that:

(a) at least 4 of $R^1$, $R^5$, $R^6$, $R^{10}$, $R^{11}$ and $R^{15}$ must be other than hydrogen, and (b) at least one of $R^1$, $R^3$, $R^5$, $R^6$, $R^8$, $R^{10}$, $R^{11}$, $R^{13}$ and $R^{15}$ is an electron donating group should none of the pairs of groups $R^{11}$ and $R^{12}$, $R^{12}$ and $R^{13}$, $R^{13}$ and $R^{14}$ and $R^{15}$ when taken together form a fused aromatic ring system.

The number of atoms in any substitutent for the central aryl rings can vary over a wide range. The substituents can constitute a single atom or many atoms such as hydrocarbyl group of 20 carbon atoms. The invention does require that substituents be present in at least four of the ortho positions so as to geometrically hinder the central boron atom, and there be present on at least one central aryl ring a substituent capable of strong resonance interaction with the boron atom via the central aryl ring.

Typical triarylboranes of this invention include:

Dimesityl-4-benzyloxy-3,5-dimethylphenylborane
Mesitylbis (2,6-dimethyl-4-methoxyphenyl)borane
Dimesityl-p-dibenzylaminophenylborane
Dimesityl-3,5-dimethyl-4-hydroxyphenylborane
Dimesityl-4-benzyloxy-2-methylphenylborane
Dimesityl-p-benzyloxyphenylborane
Dimesityl-p-aminophenylborane
Dimesityl-4-hydroxy-2-methylphenylborane
Dimesityl-p-hydroxyphenylborane
Methylbis[p-(dimesitylboryl)phenyl]amine
p-(Dimesitylboryl)phenylbis(p-tolyl)amine
p-(Dimesitylboryl)phenylbis(p-methoxyphenyl)amine
Dimesityl-p-dimethylaminophenylborane
Dimesityl-3,5-dimethyl-4-methoxyphenylborane
Dimesityl-4-dimethylamino-2-methylphenylborane
Dimesityl-p-morpholinophenylborane
Bis(2,6-dimethyl-4-methoxyphenyl)-p-morpholinophenylborane
Dimesityl-6-methoxy-2-naphthylborane
Bis(2,6-dimethyl-4-methoxyphenyl)-2-methyl-1-naphthylborane
Dimesityl-4-(N-piperidino)phenylborane
Dimesityl-5-acenaphthylborane
Dimesityl-4-dimethylamino-1-naphthylborane
Dimesityl-9-anthrylborane
Dimesityl-9-phenanthrylborane
Bis(2,6-dimethyl-4-methoxyphenyl)-9-phenanthrylborane
Dimesityl-4-stilbenylborane
Dimesityl-p-diphenylaminophenylborane
Bis-2-mesityl-3-pyrenylborane
Bis-2-mesityl-1-acenaphthenylborane
Dimesityl-4-(2-julolid-9-ylvinyl)phenylborane
9,10-bis(dimesitylboryl)anthracene
4,4'-bis(dimesitylboryl)stilbene
Tris[p-(dimesitylboryl)phenyl]amine
Bis(4-dimethylamino-2-methylphenyl)mesitylborane
Bis(2,3,5,6-tetramethylphenyl)-9-anthrylborane
Bis(2,3,4,5,6-pentamethylphenyl)-4-dimethylaminophenylborane
Bis(2,6-diethylphenyl)-9-phenanthrylborane
Bis(4-dimethylamino-1-naphthyl)-2-mesitylborane
Bis(4-dimesitylborophenyl)-N-cyclohexylamine The preferred compounds of this invention are those having an electron rich nucleus which is obtained by providing electron donating substituents on at least one aryl ring. The invention, however, includes compounds containing electron withdrawing groups such as, halogen atoms, cyano groups, carboxy groups, formyl groups, nitro groups, carbonyl-containing groups and the like.

Another preferred group of compounds employed as scintillator solutes in this invention are:

Methylbis[p-(dimesitylboryl)phenyl]amine
4,4'-bis(dimesitylboryl)stilbene
Dimesityl-p-diphenylaminophenylborane
Dimesityl-p-morpholinophenylborane
Dimesityl-4-(N-piperidino)phenylborane
Dimesityl-4-stilbenylborane
Tris[p-(dimesitylboryl)phenyl]amine.

Another preferred group of compounds employed as scintillator solutes in this invention are: methylbis[p-(dimesitylboryl)phenyl]amine, 4,4' - bis(dimesitylboryl)stilbene, dimesityl - p - diphenylaminophenylborane, dimesityl - p - morpholinophenylborane, dimesityl-4-stilbenyl-borane. A preferred compound employed in this invention is methylbis[p-dimesitylboryl)phenyl]amine.

Typically, the compounds of this invention are prepared by a step-wise sequence of reactions wherein an aryl substituent is appended directly to a substituted boron atom. Typically, an aryl Grignard reagent for example dimesitylmagnesium bromide, is reacted with boron trifluoride etherate to yield bis(dimesityl) boron fluoride plus magnesium bromide fluoride. The diarylboronfluoride can then be reacted with aryl lithium to yield a triarylborane. A more detailed description of the process of preparing the triarylboranes employed in this invention is disclosed in co-filed application Ser. No. 58,704 entitled "Novel Composition of Matter" by Babb and Grisdale said description hereby incorporated by reference.

As discussed hereinabove it was surprisingly discovered that the triarylboranes used in this invention can be employed either as a primary scintillator solute or a secondary scintillator solute. The present invention, therefore, embraces the employment of the triarylboranes in combination with primary scintillator solutes. Illustrative of the primary scintillators which may be employed in combination with triarylboranes are: 2,5-diphenyloxazole, terphenyl, 2-phenyl-5-(4-biphenylyl)-1,3,4-oxadiazole, 2-(4 - t-butylphenyl)-5-(4-biphenylyl)-,2,4-oxadiazole, 2-(1-naphthyl) - 5 - phenyloxazole, 2,5-di-4-diphenylyl)oxazole, 1,1'-dinaphthyl, and the like.

In the process of detecting neutrons, the scintillator solution employing the triarylboranes disclosed herein undergo the nuclear $B^{10}(n,\alpha)Li^7$ reaction hence the solutions of this invention have the advantage of providing a simpler system as compared with prior art systems which must incorporate neutron capture addenda. The scintillator solution, however, may incorporate neutron capture solutes in addition to the triarylboranes. A preferred group of neutron capture addenda are boron compounds albeit other compounds can be employed, for example, compounds capable of the nuclear $Li^6(n,\alpha)H^3$ reaction are also useful. Illustrative of the boron containing compounds that can be employed are alkyl borates such as trimethyl borate, and the like; boron trifluoride; triborinetriamine and the like.

The scintillator solutions of this invention can comprise any of the well-known energy transfer solvents. The solvents are typically transparent hydrocarbons, however, ethers and mixed solvents can be readily employed. For particular situations, such as, for example in solubility problems, mixed solvents are advantageously employed. Suitable solvents include aromatic solvents such as benzene, alkyl benzenes such as xylene, toluene, phenylcyclohexane, ethylbenzene, triethylbenzene, butylbenzene, cumene, and the like; aromatic ethers, for example, anisole and the like; and mixed solvents such as naphthalenedioxane, toluene-methanol, toluene-ethanol and the like.

In a preferred embodiment of this invention naphthalenedioxane or toluene can be employed as the energy transfer solvent.

The liquid scintillation counting compositions of this invention can contain from about $10^{-5}$ M to about $5\times10^{-10}$ M of the triarylboranes. Typically when employed as the sole scintillator solute, the triarylboranes are employed in a concentration range of from about $5 \times 10^{-3}$ M to about $5 \times 10^{-2}$ M and when employed as a secondary scintillator solute, from about $1 \times 10^{-5}$ M to about $5 \times 10^{-3}$ M. The primary fluors employed in combination with the triarylboranes can be present in a range of from about $5 \times 10^{-3}$ M to about $5 \times 10^{-2}$ M.

The scintillator solutions of this invention employing the triarylboranes are readily prepared by merely adding the triarylborane to a suitable energy transfer solvent, for example, naphthalene-dioxane. The solution thus obtained may be employed as is or other addenda may be added such as the neutron capture solutes, gamma capture solutes, primary scintillator solutes, suspending agents and other modifying agents well-known in the art.

Illustrative scintillator compositions of this invention comprise an energy transfer solvent and at least one fluorescent solute which is a triarylborane. A preferred scintillator solution of this invention comprises naphthalenedioxane, a triarylborane such as methylbis[p-(dimesitylboryl)phenyl]amine as the secondary scintillator solute and 2,5-diphenyloxazole as the primary scintillator solute. Another preferred scintillator solution comprises toluene as the energy transfer solvent, 2,5-diphenyloxazole as the primary scintillator solute and a triarylborane such as methylbis[p-(dimesitylboryl)phenyl]amine as the secondary scintillator solute.

In another embodiment of this invention there is provided improved scintillation counters, the improvement comprising employing as a scintillator solution one comprising an energy transfer solvent and at least one fluorescent solute which is a triarylborane.

The scintillation counter in its simplest form comprises:

(a) a scintillator solution;
(b) a photocathode which emits photoelectrons when excited by the luminescence radiated from the scintillator;
(c) means for multiplying the number of emitted electrons, typically one or a series of dynodes;
(d) an anode at which the electrons are collected;
(e) an output capacitor in which a voltage pulse is created;
(f) an external pulse recording circuit, usually through a linear pulse amplifier.

In another embodiment of this invention there is provided a "cocktail" comprising the material to be tested and the scintillator solutions. A typical cocktail of this invention comprises a beta emitter such as a tritium-labeled organic compound or carbon 14 labeled organic compound and the scintillator solution comprising an energy transfer solvent and at least one fluorescent solute which is a triarylborane. Other emitters can be employed in the cocktail, for example $\alpha$-, $\gamma$-, X-ray, meson and neutron emitters and the like. In another embodiment there is provided a process for detecting, measuring or counting high energy radiation with a scintillation counter such as described. The process comprises passing high energy radiation through a scintillator solution, detecting the fluorescence and recording pulses produced, the improvement comprising employing as a fluorescent solute a triarylborane described herein.

This invention can be further illustrated by the following examples of preferred embodiments thereof, although it will be understood that these examples are included merely for illustrating this invention.

Luminescence tests were performed on representative samples of the compounds of this invention using a fluorimeter of the type described by L. Costa, F. Grum, and D. J. Paine, Applied Optics, 8, 1149 (1960).

EXAMPLE 1

Solutions of several typical scintillator solutes of the invention are prepared in p-dioxane and in toluene at a concentration of $10^{-3}$ M. Solutions are additionally prepared comprising one of two commercially available fluors, PPO (2,5-diphenyloxazole) and DMPOPOP 2,2'-p-phenylenebis(4-methyl-5-phenyloxazole). The solutions are evaluated on the fluorimeter for the following:

(1) The optimum excitation wavelength
(2) The wavelength of maximum emission and
(3) The quantum yield.

The results are summarized in Table I.

TABLE I.—LUMINESCENCE EFFICIENCIES OF $10^{-3}$ MOLAR SOLUTIONS OF TRIARYLBORANES

| Compound | Solvent | $\lambda_{max}$, nanometers | | Luminescence quantum yield (percent) |
|---|---|---|---|---|
| | | Excitation | Emission | |
| 1 | p-Dioxane | 398 | 430 | 59.5 |
| 1 | Toluene | 398 | 430 | 51.3 |
| 2 | p-Dioxane | 398 | 425 | 54.3 |
| 2 | Toluene | 398 | 430 | 48.5 |
| 3 | p-Dioxane | 398 | 445 | 45.3 |
| 3 | Toluene | 398 | 440 | 42.2 |
| 4 | p-Dioxane | 365 | 440 | 32.3 |
| 4 | Toluene | 365 | 415 | 25.5 |
| 5 | p-Dioxane | 365 | 450 | 31.4 |
| 5 | Toluene | 365 | 430 | 26.0 |
| 6 | p-Dioxane | 380 | 395 | 41.2 |
| 6 | Toluene | 380 | 400 | 32.4 |
| 7 | p-Dioxane | 398 | 441 | 28.7 |
| 7 | Toluene | 398 | 440 | 26.4 |
| PPO | p-Dioxane | 335 | 360 | 29.6 |
| PPO | Toluene | 335 | 360 | 26.2 |
| DMPOPOP | p-Dioxane | 398 | 425 | 50.5 |
| DMPOPOP | Toluene | 398 | 425 | 44.3 |

NOTE.—1=Methylbis[p-(dimesitylboryl)phenyl]amine; 2=4,4'-bis-(dimesitylboryl)stilbene; 3=Dimesityl-p-diphenylaminophenylborane; 4=Dimesityl-p-morpholinophenylborane; 5=Dimesityl-4-(N-piperidino)phenylborane; 6=Dimesityl-4-stilbenylborane; 7=Tris[p-(dimesitylboryl)phenyl]amine.

The results clearly indicate that the quantum yields of the solutions of this invention compare favorably and are generally superior to the quantum yield of the commercial solutes. In addition, a number of the compounds emit at higher wavelengths than the commercial solutes which provides better matching characteristics with photomultiplier tubes.

EXAMPLE 2

Evaluation of triarylboranes in a primary solute (cocktail)

Solutions of 4.9 g./liter of a primary solute (the compound to be tested) are prepared in toluene and in p-dioxane. The p-dioxane solutions also contain 120 g./liter of naphthalene. To each of three separate 15 cc. portions of the solutions are added either tritium-labeled benzoic acid to a strength of about 0.225 $\mu$Ci or carbon [14] labeled benzoic acid to a strength of about 0.0546 $\mu$Ci.

Each sample is examined at three different wavelengths of excitation for quantum yield, the excitation wavelength being:

(a) The solvent excitation wavelength (288 nm.)
(b) The excitation wavelength of PPO (338 nm.)
(c) The optimum excitation wavelength of the material being tested (398 nm.)

The results are summarized in Table II.

The samples are examined for the relative counting efficiencies. The results are recorded in Table III.

TABLE II.—EVALUATION OF TRIARYLBORANES AS PRIMARY LIQUID SCINTILLATORS IN A COCKTAIL

| Compound | Solvent | $\lambda_{max}$ (nanometers) Excitation | Emission | Luminescence quantum yield (percent) |
|---|---|---|---|---|
| 1 | p-Dioxane-naphthlene | 398 | 430 | 76.0 |
| 1 | do | 338 | 430 | 46.1 |
| 1 | do | 288 | 430 | 39.9 |
| 1 | Toluene | 398 | 430 | 76.6 |
| 1 | do | 338 | 430 | 45.1 |
| 1 | do | 288 | 430 | 46.5 |
| 2 | p-Dioxane-naphthlene | 398 | 425 | 69.4 |
| 2 | do | 338 | 425 | 38.5 |
| 2 | do | 288 | 425 | 29.7 |
| 3 | do | 398 | 445 | 57.8 |
| 3 | do | 338 | 445 | 34.0 |
| 3 | do | 288 | 445 | 34.3 |
| 3 | Toluene | 398 | 439 | 54.9 |
| 3 | do | 338 | 439 | 32.6 |
| 3 | do | 288 | 439 | 36.1 |
| PPO | p-Dioxane-naphthlene | 338 | 360 | 41.7 |
| PPO | do | 288 | 360 | 31.4 |
| PPO | Toluene | 338 | 360 | 33.1 |
| PPO | do | 288 | 360 | 27.2 |

NOTE.—1=Methylbis[p-(dimesitylboryl)phenyl]amine; 2=4,4'-bis-(dimesitylboryl)stilbene; 3=Dimesityl-p-diphenylaminophenylborane.

TABLE III—RELATIVE COUNTING EFFICIENCY (PERCENT)

| Compound | Solvent | Tritium counting | Carbon[14] counting |
|---|---|---|---|
| Methylbis[p-(dimesitylboryl)phenyl]amine | p-Dioxane-naphthlene | 16.0 | 62.6 |
| Do | Toluene | 25.7 | 73.8 |
| 4,4'-bis(dimesitylboryl)stilbene | p-Dioxane-naphthlene | 1.9 | 14.6 |
| Dimesityl-p-diphenylaminophenylborane | do | 13.8 | 63.9 |
| Do | Toluene | 21.2 | 73.8 |
| PPO | p-Dioxane-naphthlene | 15.9 | 67.9 |
| PPO | Toluene | 25.2 | 79.2 |

EXAMPLE 3

Evaluation of methylbis[p-(dimesitylboryl)phenyl]amine as a secondary solute

Solutions are prepared containing 4.9 g./liter of PPO as a primary fluor and 0.1 g./liter of methylbis[p-(dimesitylboryl)phenyl]amine, as a secondary fluor in toluence and in p-dioxane as in Example 2. 120 g./liter of naphthalene is added to the solutions wherein p-dioxane is the solvent. Tritium or carbon[14] labeled benzoic acid is added to the solutions as described in Example 2.

As a comparison, samples of a premixed commercial scintillator composed of 98 percent PPO and 2 percent POPOP is evaluated as a cocktail containing 4.9 g./liter of PPO and .1 g./liter of POPOP and the same amounts of carbon[14] or tritium labeled benzoic acid as above. The samples are examined as in Example 2 and the data are recorded in Table IV and Table V.

TABLE IV

| Primary and secondary solutes | Solvent | $\lambda_{max}$ (nanometers) Excitation | Emission | Luminescence quantum yield (percent) |
|---|---|---|---|---|
| 1 plus PPO | p-Dioxane-naphthlene | 398 | 440 | 66.2 |
| 1 | p-Dioxane | 338 | 360 | 39.5 |
| 1 | do | 288 | 360 | 36.2 |
| 1 | Toluene | | | |
| 1 | do | | | |
| 1 | do | | | |
| PPO plus POPOP | p-Dioxane-naphthlene | 365 | 418 | 48.4 |
| Do | do | 338 | 360 | 37.1 |
| Do | do | 288 | 360 | 33.3 |

NOTE.—=Methylbis[p-(dimesitylboryl)phenyl]amine.

TABLE V.—RELATIVE COUNTING EFFICENCY (PERCENT)

| Solvent | Tritium counting | Carbon counting |
|---|---|---|
| 1 plus PPO p-Dioxane-naphthlene | 18.8 | 65.6 |
| Do do | 18.5 | 65.8 |
| Do Toluene | 33.0 | 77.9 |
| Do do | 31.7 | 78.5 |
| PPO plus POPOP p-Dioxane-naphthlene | 22.1 | 69.8 |
| Do do | 20.0 | 68.6 |
| Do Toluene | 35.6 | 79.1 |
| Do do | 33.1 | 78.2 |

NOTE.—1=Methylbis[p-(dimesitylboryl)phenyl]amine.

The "cocktails" of this invention which contained water dissolved therein did not manifest any noticeable adverse effects.

The invention has been described in detail with particular reference to preferred embodiments thereof, but it will be understood that variations and modifications can be effected within the spirit and scope of the invention.

There is claimed:

1. In a method of scintillation counting employing a scintillation solution containing a scintillation solute and an energy transfer solvent, the improvement wherein said scintillation solute is a triarylborane having the formula:

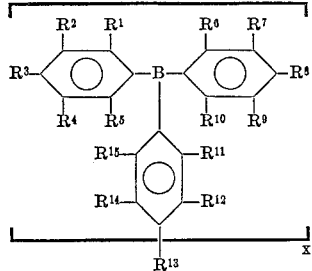

wherein $x$ is an integer of 1 to 3; each of $R^1$, $R^2$, $R^4$, $R^5$, $R^6$, $R^7$, $R^9$, $R^{10}$, $R^{11}$, $R^{12}$, $R^{14}$ and $R^{15}$ is hydrogen, halide, an alkyl group, a phenyl group, or an electron donating group or each of $R^1$ and $R^2$, $R^4$ and $R^5$, $R^6$ and $R^7$, $R^9$ and $R^{10}$, $R^{11}$ and $R^{12}$, $R^{12}$ and $R^{13}$, $R^{13}$ and $R^{14}$ or $R^{14}$ and $R^{15}$ when taken together represent the atoms necessary to complete a fused aromatic ring system; each of $R^3$ and $R^8$ is hydrogen, halide, cyano, carboxy, an alkyl group, or an electron donating group; $R^{13}$ is one of the groups described for $R^3$ and $R^8$ when $x$ is 1, a covalent bond, alkylamino, cycloalkylimino or vinylene when $x$ is 2, an

when $x$ is 3; with the provisos that:
(a) at least four of $R^1$, $R^5$, $R^6$, $R^{10}$, $R^{11}$ and $R^{15}$ must be other than hydrogen, and
(b) at least one of $R^1$, $R^3$, $R^5$, $R^6$, $R^8$, $R^{10}$, $R^{11}$, $R^{13}$ and $R^{15}$ is an electron donating group should none of the pairs of groups $R^{11}$ and $R^{12}$, $R^{12}$ and $R^{13}$, $R^{13}$ and $R^{14}$, and $R^{14}$ and $R^{15}$ when taken together form a fused aromatic ring.

2. A method as described in claim 1 wherein said triarylborane is utilized as the sole scintillation solute in said scintillation solution.

3. A method as described in claim 1 wherein said triarylborane is utilized as a secondary solute and said scintillation solution additionally contains a primary solute.

4. A method as described in claim 3 wherein said primary solute is a member selected from the group consisting of 2,5-diphenyloxazole, terphenyl, 2-phenyl-5-(4-biphenylyl)-1,3,4-oxadiazole, 2-(4-t-butylphenyl)-5-(4-biphenylyl)-1,3,4-oxadiazole and 2-(1-naphthyl)-5-phenyloxazole.

5. A method as described in claim 4 wherein the concentration of said primary solute is in the range from about $5 \times 10^{-3}$ M to about $5 \times 10^{-2}$ M and the concentration of said secondary solute is in the range from about $1 \times 10^{-5}$ M to about $5 \times 10^{-3}$ M.

6. A method as described in claim 1 wherein said energy transfer solvent is benzene.

7. A method as described in claim 1 wherein said energy transfer solvent is a mixture of naphthalene and dioxane.

8. A method as described in claim 1 wherein said energy transfer solvent is toluene.

9. In a method of scintillation counting employing a scintillation solution containing a scintillation solute and an energy transfer solvent, the improvement wherein said scintillation solute is a member selected from the group consisting of methylbis[p-(dimesitylboryl)phenyl]amine, 4,4' - bis(dimesitylboryl)stilbene, dimesityl - p - diphenylaminophenylborane, dimesityl - p - morpholinophenylborane, dimesityl-4-(N-piperidino)phenylborane, dimesityl-4-stilbenylborane and tris[p-(dimesitylboryl)phenyl]amine.

10. In a method of scintillation counting employing a scintillation solution containing a scintillation solute and an energy transfer solvent, the improvement wherein said scintillation solute is methylbis[p-(dimesitylboryl)phenyl]amine.

References Cited

UNITED STATES PATENTS

| | | | |
|---|---|---|---|
| 3,080,221 | 3/1963 | Nützel et al. | 260—606.5 B |
| 2,952,645 | 9/1960 | Groszos et al. | 252—301.3 R |
| 3,068,178 | 12/1962 | Kallmann et al. | 252—301.2 R |
| 3,372,127 | 3/1968 | Thomas et al. | 252—301.2 R |

OTHER REFERENCES

Noller: Chemistry of Organic Compounds, W. B. Saunders Co., Philadelphia, 3rd ed., 1966, pp. 472–3.

Noller: Chemistry of Organic Compounds, W. B. Saunders Co., Philadelphia, 1961, 2nd ed., pp. 116–8.

Finar: Organic Chemistry, Longmans, Green and Co., London, 3rd ed., 1958, pp. 657–660.

JAMES E. POER, Primary Examiner

A. P. DEMERS, Assistant Examiner

U.S. Cl. X.R.

250—71.5 R, 83; 252—301.1 L; 260—568, 571, 576, 578